Feb. 24, 1970  M. E. NEREM  3,496,689
SANDWICH PANEL STRUCTURE

Filed Jan. 8, 1968  2 Sheets-Sheet 1

INVENTOR.
MARVIN E. NEREM
BY
Burd, MacEachron, Braddock,
Bartz & Schwartz
ATTORNEYS

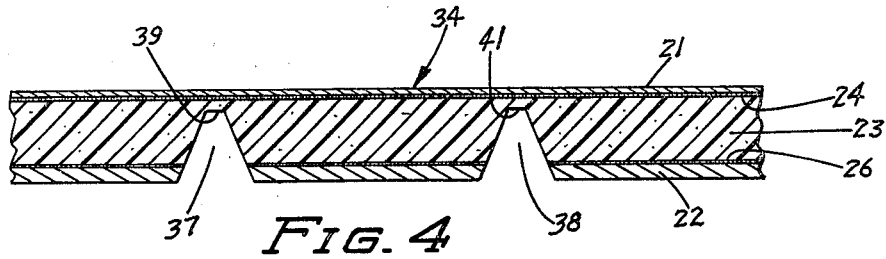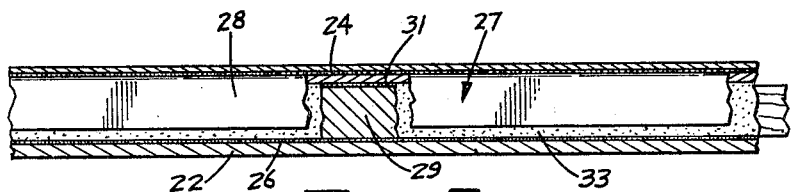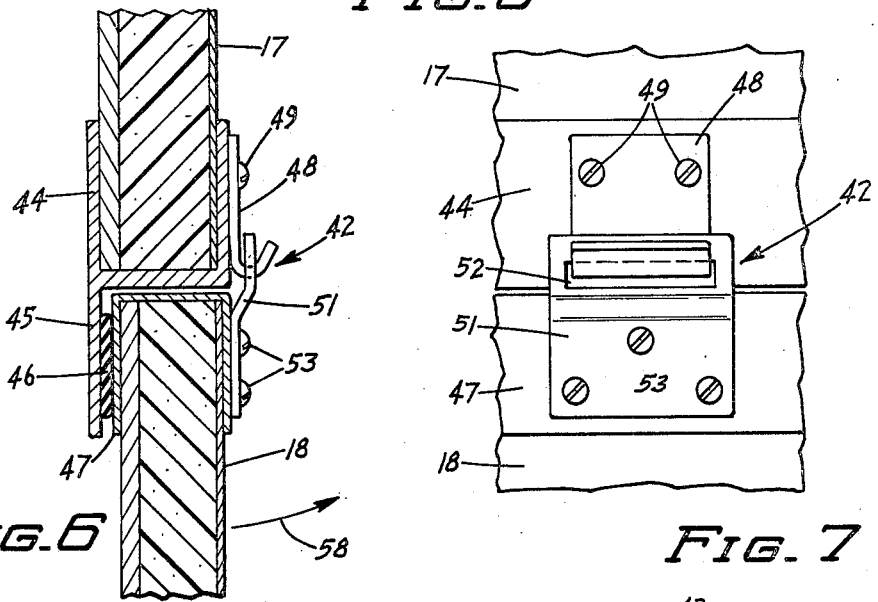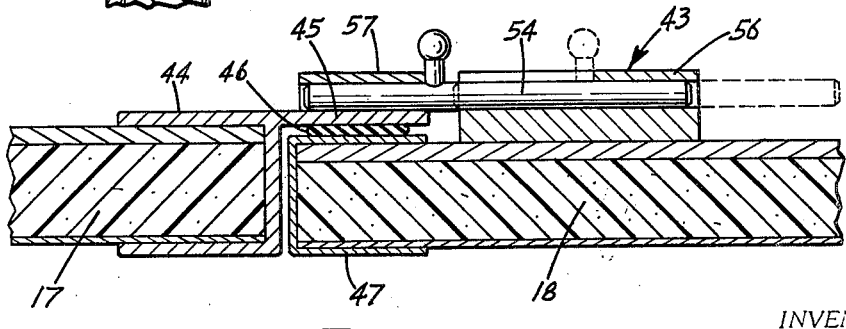

United States Patent Office 3,496,689
Patented Feb. 24, 1970

3,496,689
SANDWICH PANEL STRUCTURE
Marvin E. Nerem, Forest City, Iowa, assignor to Winnebago Industries, Inc., Forest City, Iowa, a corporation of Iowa
Filed Jan. 8, 1968, Ser. No. 696,396
Int. Cl. E06b 1/04; E04c 1/00, 2/00
U.S. Cl. 52—204                                       15 Claims

ABSTRACT OF THE DISCLOSURE

A pickup camper mounted on a truck formed from sandwich panels having an outer sheet metal facing and an inner plywood facing bonded to core material of expanded polystyrene. The midsection of the panel is reinforced with a longitudinal metal channel carrying a wood beam. The base of the channel is bonded to the sheet metal facing. The bottom of the beam is bonded to the plywood facing. A multi-sided structure is formed by providing two pairs of spaced parallel V-grooves in the plywood facing on opposite sides of the reinforcing channel. The metal facing is bent along lines following the bases of the V-grooves to form chamfer-type corners between a roof section and side wall sections of the structure. The back of the structure has an end wall carrying a large removable panel releasably hinged to the top of the end wall and held in assembled relation with the end wall with a pair of barrel bolts.

Background of invention

Structures known as pickup campers and pickup caps mounted on the bodies of pickup trucks have been developed and are widely used. These structures are made from a plurality of separate pieces which must be assembled prior to use. An example of this type of shelter is shown in applicant's United States Patent No. 3,219,383. When these structures are made from laminated or sandwich panels it is found desirable that the large substantially horizontal roof be reinforced to withstand heavy weights or loads that may be placed on the roof. Metal reinforcing members secured to both the inside and outside facings of these panels conduct heat resulting in moisture and sweat problems on the inside plywood panel. Utilization of a single wood beam does not produce the desired reinforcing strength without adding excessive weight to the panels. The reinforcing of the roof section is also desirable when the rear end wall of the structure has a large removable panel to insure the strength of the rear end wall and roof of the structure.

Summary of invetnion

The invention is directed to a sandwich panel convertible into a multi-sided structure. The panel has a first facing and a second facing bonded to opposite sides of a core material. Interposed between the facings is an elongated reinforcing means bonded to the facings. The reinforcing means has at least one flange projected toward one of the facings. This flange is spaced from the one facing. Secured to the flange is a rigid thermo-insulating member, as a wood beam, bonded to the inner facing so as to provide an elongated rigid connection between the outer facing and the inner facing having high strength and low thermo-conductivity to eliminate moisture problems on the inner facing of the structure. This reinforced panel structure cooperates with V-grooves used to form the corners of the structure and a removable panel in the end wall of the structure to provide a rigid, safe, and economical multi-sided structure.

In the drawings

FIGURE 4 is a sectional view of the corner of the structure prior to the bending of the panel to form the structure;

FIGURE 5 is an enlarged sectional view taken along the line 5—5 of FIGURE 2;

FIGURE 6 is an enlarged sectional view taken along the line 6—6 of FIGURE 1;

FIGURE 7 is a front view of the hinge joint of FIGURE 6; and

FIGURE 8 is an enlarged sectional view taken along the line 8—8 of FIGURE 1.

Figure 1:
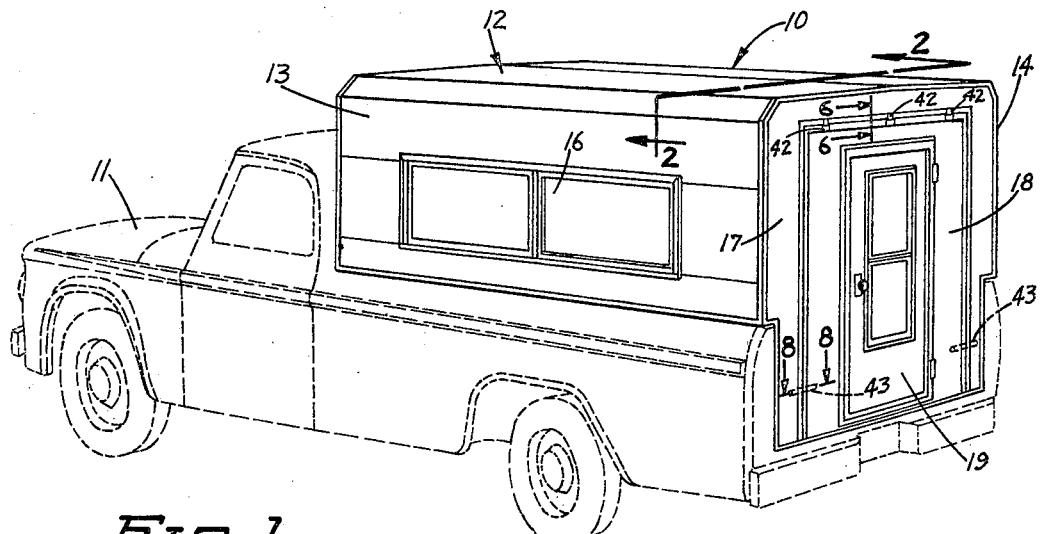
FIGURE 1 is a rear prospective view of a camper mounted on a pickup truck.

Referring to the drawings there is shown in FIGURE 1, a camper indicated generally at 10 mounted on the body of a pickup truck 11. Camper 10 has a generally horizontal roof section 12 and upright side walls 13 and 14. Longitudinal windows 16 are mounted in the side walls 13 and 14. The rear end of the camper is closed with an upright back wall 17 carrying a large removable panel 18. The center section of panel 18 has a swinging upright door 19. Panel 18 is a large lift off panel forming a major part of the back wall. When the panel 18 is removed from the rear wall relatively large objects can be placed in the camper on the truck bed.

The roof section and side wall sections are formed from a one piece sandwich panel into a large inverted U-shaped multi-sided structure. The front and rear walls are secured to the opposite ends of the multisided structure in a conventional manner to enclose the camper.

Figure 3:
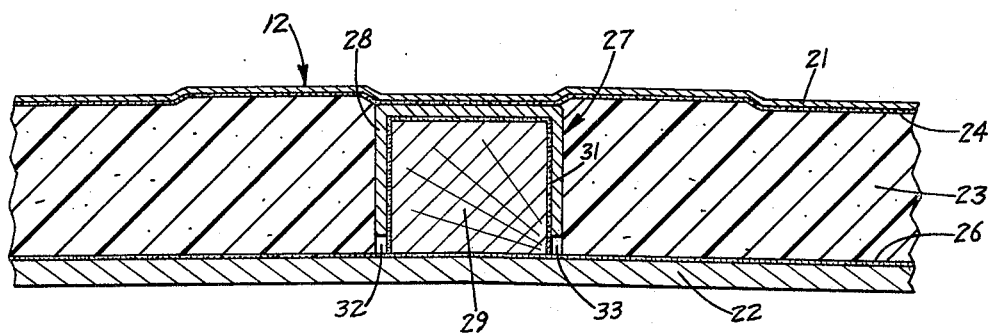
FIGURE 3 is an enlarged sectional view of the center of the roof section of FIGURE 2.

Referring to FIGURE 3, the roof section 12 comprises a sandwich panel having an outer pliable and bendable facing or skin 21, as sheet metal, corrugated sheet aluminum or the like, and an inner rigid facing or skin 22, as plywood, hard board or the like. Interposed between the facings 21 and 22 is core material of expanded foam plastic 23, preferably expanded foam polystyrene. Layers of bonding material 24 and 26 secure or bond the outer facing 21 and inner facing 22 to opposite sides of the core material.

Figure 2:
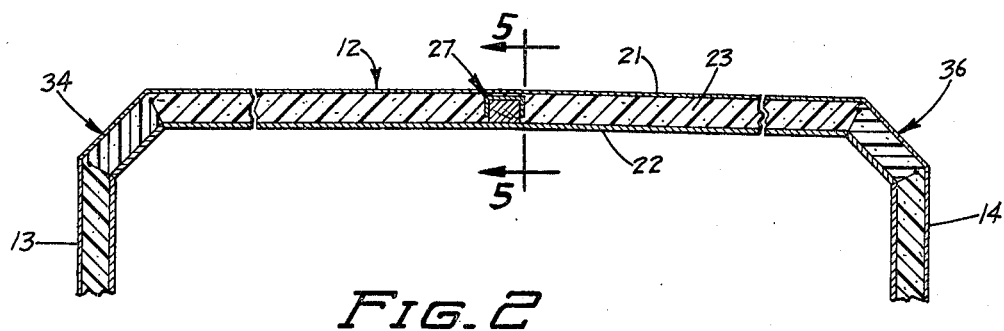
FIGURE 2 is an enlarged sectional view taken along the line 2—2 of FIGURE 1.

Located between the facings 22 and 24 along the longitudinal midline of the roof section 12 is an elongated reinforcing means indicated generally at 27. As shown in FIGURE 5, the reinforcing means 27 extends the entire length of the roof section to provide the roof section with strength and stability. Returning to FIGURES 1 and 2 the roof section 12 diverges slightly downwardly from the mid-portion carrying the reinforcing means to increase the strength of the roof section and to provide a slight slope for the drainage of water from the roof section.

The elongated reinforcing means 27 comprises an inverted U-channel 28, of metal as aluminum, carrying an elongated filler or beam 29, of wood or similar insulating material. The beam 29 fits within the channel 28 and is bonded thereto with bonding material 31. The flanges of the channel 28 are shorter than the thickness of the beam leaving spaces 32 and 33 between the ends of the flanges and the inner facing 22. The flanges do not engage the facing 22. The spaces 32 and 33 minimize conductivity of heat from the inner facing to the outer facing caused by unequal temperatures on the opposite sides of the panel. This eliminates the accumulation of moisture on the inner facing 22 in strips adjacent the channel 28. The layers of bonding material 24 and 26 also bond the base of channel 28 to facing 21 and the opposed or bottom side of the beam 29 to facing 22 so that the reinforcing means 27 is an integral part of the panel 12. The facings 21, 22, the core material 23 and reinforcing means form a solid one piece panel.

The reinforcing means 27 is placed in the sandwich panel during the manufacturing process. The channel 28 and beam 29 are initially bonded together and then placed between the inner and outer facings 21 and 22 adjacent the core material 23. The bonding material is then applied to opposite sides of the core and reinforcing means. The inner and outer facings are subjected to pressure and heat operative to laminate the sandwich panel together into a one piece panel. The bonding material is preferably an adhesive material having a base of natural reclaimed rubber combined with resin reinforced elastomer. Other adhesives and adhesives combined with sealants can be used to effect a bond between the core material 23, reinforcing means 27 and the inner and outer facings 21 and 22.

Returning to FIGURE 1, the roof section 12 is joined to the side sections 13 and 14 with chamfer-type corner sections indicated generally at 34 and 36 respectively. These corner sections are formed by bending the one piece sandwich panel to a multi-sided structure. As shown in FIGURE 4, prior to the formation of the corner 34 the panel is cut with a pair of parallel V-grooves 37 and 38 to divide the panel into a roof section and a side wall section. The grooves 37 and 38 extend through the rigid plywood facing 22 into the core material 23. The bottoms or bases 39 and 41 of the grooves are flat and spaced from the metal outer facing 21 so that the cutting tools forming the grooves do not touch, cut or injure the metal facing 21. The metal facing 21 opposite the grooves 37 and 38 remains whole and is bent along the linear bases of the grooves to form corner 34 at an angle less than 90 degrees at each bend. The small amount of core material between the bases of the grooves and the outer facing 21 is subjected to a minimum of stress and fills out the linear bends of the panel providing reinforcement for the sheet metal facing 21. Corner 36 is formed in a manner similar to corner 34. The use of the elongated reinforcing means 27 minimizes the deflection of the roof section when subjected to loads and thereby reduces the stresses on the corner sections 34 and 36.

Returning to FIGURE 1, the lift off removable panel 18 is connected to the back wall 17 by a first connecting means comprising a plurality of hinges 42 pivotally mounting the top of the panel 18 to a transverse top portion of the back wall 17 carrying the roof section 12. A second connecting means comprising releasable fasteners 43, as barrel bolts, to lock the bottom side portions of the panel 18 to opposite sides of the back wall 17.

Referring to FIGURE 6, the large opening in the back wall 17 is surrounded with an H-shaped member 44 secured to the peripheral portions of the back wall 17 defining the edges of the large opening. Member 44 has an inwardly directed flange 45 carrying a seal 46 which engages a peripheral portion of the removable panel 18. The panel 18 is surrounded with a U-shaped edge 47 which cooperates with the seal to minimize air leakage and vibration of the panel 18. Hinges 42 each comprise a hook bracket 48 secured with fastening means 49, as bolts or screws, to the outside flange of H-member 44. The hook portion of the bracket opens in an upward direction and cooperates with an eye bracket 51 having a transverse slot 52 secured to the edge 47 with fasteners 53, as screws or bolts. The hook portion of the bracket 48 projects through the slot 52 to pivotally mount the panel 18 on the back wall for movement about a horizontal transverse axis. Hinges 42 permit the panel 18 to swing away from the back wall 17 as indicated by the arrow 58 in FIGURE 6.

Referring to FIGURE 8, the releasable fastener 43 comprises a sliding bolt 54 movably mounted in a slide support 56 secured to the inside of the removable panel 18. Aligned with the outer end of bolt 54 is a lock support 57 secured to the flange 45 of the H-shaped member 44. The bolt 54 moves transversely as shown in broken lines to release the bottom of panel 18 from the back wall 17.

To remove the panel 18 both fasteners 43 are released and the bottom of the panel is moved in an outward direction pivoting the top of the panel about the hinges 42. The panel is then lifted from the hook portions of the brackets 48 thereby uncoupling the panel 18 from the back wall 17. The opening in the back wall is large permitting the loading of relatively large objects on the bed of the truck.

The back wall 17 with its removable panel 18 is shown as a sandwich panel having an outer skin of metal and an inner rigid plywood skin bonded to opposite sides of expanded foam plastic core material. This sandwich panel is similar to the one piece sandwich panel used in the formation of the roof section and side wall sections 13 and 14.

While there have been shown and described the reinforced sandwich panel converted into a pickup camper, it is to be understood that the reinforced sandwich panel can be used in other structures. The invention is defined in the following claims.

The embodiments of the invention in which an exclusive property or privilege is claimed are defined as follows:

1. A sandwich panel comprising: a first facing, second facing spaced from the first facing, core material interposed between the first facing and the second facing, bonding material secured the first facing and the second facing to opposite sides of the core material, and elongated reinforcing means located between the facings, said bonding material securing the first facing and the second facing facing said reinforcing means having an elongated rigid member with a flat base in surface engagement with and bonded directly to the first facing and at least one flange projected toward the second facing, said flange being spaced from the second facing, and an elongated rigid thermo-insulating beam having faces located adjacent the base and flange and a flat surface in engagement with the second facing, and bonding material securing the beam to the base, flange and second facing.

2. The sandwich panel of claim 1 wherein said elongated rigid member is a U-shaped channel having a base bonded to the first facing with bonding material and flanges projected toward the second facing, the ends of said flanges being spaced from the second facing, and said beam located within said channel and bonded to the base, flanges and second facing.

3. The sandwich panel of claim 2 wherein the channel is metal and the beam is rigid insulating material.

4. The sandwich panel of claim 3 wherein the one facing is sheet metal, the other facing a wood member, and the core material is expanded foam plastic.

5. The sandwich panel of claim 1 wherein said elongated rigid member is a U-shaped metal channel having a base bonded to the first facing with bonding material and flanges projected toward the second facing, the ends of said flanges being spaced from the second facing, a wood beam located within said channel and bonded to the second facing, and bonding material securing the beam to the channel, said first facing is sheet metal, the second facing is a wood member, and the core material is foamed polystyrene.

6. The sandwich panel of claim 1 wherein the first facing is a bendable sheet material and the second facing is of rigid sheet material, said panel having V-grooves extended through the rigid facing into the core material adjacent but spaced from the bendable facing to divide the panel into sections, said first bendable facing remaining whole opposite all of the V-grooves whereby force applied to the sections of the panel on opposite sides of the V-grooves produce bends in the bendable facings forming said panel into a multi-sided structure.

7. The sandwich panel of claim 7 wherein said V-grooves include a first pair of spaced V-grooves on one side of said reinforcing means and a second pair of spaced V-grooves on the other side of said reinforcing means, all of said V-grooves extended substantially parallel to each other and substantially parallel to said reinforcing means.

8. The sandwich panel of claim 1 wherein said first facing is sheet metal, said second facing, wood, and said core material foamed plastic, said reinforcing means including a metal channel having a base bonded to the sheet metal and flanges projected toward the second facing, an insulating beam located within the channel and bonded to the second facing, said panel having a first pair of spaced V-grooves on one side of the reinforcing means and a second pair of spaced V-grooves on the other side of the reinforcing means, all of said V-grooves extended substantially parallel to each other and substantially parallel to the reinforcing means.

9. A multi-sided structure comprising: a roof section, side wall sections and rear end wall, said roof section having an outer facing and an inner facing, core material located between said facings, bonding material securing the facings to opposite sides of the core material, elongated reinforcing means located between said facings of the roof section and extended longitudinally of the roof section, said bonding material securing the reinforcing means to one of said facings, said reinforcing means including a first elongated rigid member having a flat base bonded to the outer facing and at least one flange projected toward the inner facing, said flange being spaced from the inner facing and a second elongated rigid thermo-insulating beam located adjacent the base and flange and bonded thereto, said beam having a face bonded to the inner facing.

10. The structure of claim 9 wherein said outer facing is a sheet metal member and said reinforcing means includes a channel member having a base bonded to the sheet metal and flanges projected toward the inner facing, said beam located within said channel bonded to the inner facing.

11. The structure of claim 10 wherein said inner facing is a plywood sheet.

12. The structure of claim 9 wherein said rear end wall has a removable panel extended substantially the entire width of said rear wall, coacting means on said rear wall and removable panel cooperating to releasably hold said removable panel in engagement with the remainder of said rear wall whereby upon removal of said removable panel relatively large objects may be placed in the structure through the opening in the rear wall.

13. The structure of claim 12 wherein said coacting means includes first means cooperating with the top portion of the removable panel and the rear wall and second means cooperating with other portions of the removable panel and rear wall.

14. The structure of claim 13 wherein said first means includes upright hinge members secured to the rear wall over the top of the removable panel to releasably and swingably hold the removable panel in engagement with the remainder of the rear wall.

15. The panel structure of claim 13 wherein the second means releasably connects the sides of the removable panel to the rear wall.

References Cited

UNITED STATES PATENTS

| | | | |
|---|---|---|---|
| 1,644,886 | 10/1927 | Lee | 49—67 |
| 1,646,522 | 11/1927 | Berg | 49—67 |
| 2,181,164 | 11/1939 | Alexander | 52—631 |
| 2,256,375 | 9/1941 | Bonsall | 52—629 |
| 3,327,441 | 6/1967 | Kelly | 52—309 |
| 3,331,174 | 7/1967 | Wesch | 52—309 |

JOHN E. MURTACH, Primary Examiner

U.S. Cl. X.R.

52—309, 481, 631; 161—161; 296—23

PO-1050
(5/69)

UNITED STATES PATENT OFFICE
CERTIFICATE OF CORRECTION

Patent No. 3,496,689      Dated February 24, 1970

Inventor(s) MARVIN E. NEREM

It is certified that error appears in the above-identified patent and that said Letters Patent are hereby corrected as shown below:

Column 1, Line 54, cancel "invetnion" and insert --invention--;

Column 4, Line 31, cancel "secured" and insert --securing--;

Column 4, Line 34, after "securing" insert --the reinforcing means to--;

Column 4, Line 34, after "first facing" insert --,--;

Column 4, Lines 34 and 35, cancel "and the second facing facing";

Column 5, Line 1, cancel "7" (second occurrence) and insert --6--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents